(12) United States Patent
Wang et al.

(10) Patent No.: US 7,483,933 B2
(45) Date of Patent: Jan. 27, 2009

(54) CORRELATION ARCHITECTURE FOR USE IN SOFTWARE-DEFINED RADIO SYSTEMS

(75) Inventors: Yan Wang, Plano, TX (US); Eran Pisek, Plano, TX (US); Jasmin Oz, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 771 days.

(21) Appl. No.: 11/150,511

(22) Filed: Jun. 10, 2005

(65) Prior Publication Data
US 2006/0184599 A1   Aug. 17, 2006

Related U.S. Application Data

(63) Continuation-in-part of application No. 11/123,313, filed on May 6, 2005.

(60) Provisional application No. 60/653,968, filed on Feb. 17, 2005, provisional application No. 60/654,035, filed on Feb. 17, 2005.

(51) Int. Cl.
*G06F 17/15* (2006.01)
*G06F 7/52* (2006.01)

(52) U.S. Cl. .................... 708/422; 708/622
(58) Field of Classification Search ............... 708/422, 708/622, 230
See application file for complete search history.

(56) References Cited

U.S. PATENT DOCUMENTS

| | | | | | |
|---|---|---|---|---|---|
| 5,365,549 | A | * | 11/1994 | Kazecki | 375/343 |
| 6,914,934 | B1 | * | 7/2005 | Lou et al. | 375/229 |
| 2002/0169813 | A1 | * | 11/2002 | Pechanek et al. | 708/622 |
| 2003/0009502 | A1 | * | 1/2003 | Katayanagi | 708/622 |

* cited by examiner

*Primary Examiner*—Tan V Mai

(57) ABSTRACT

A re-configurable correlation unit for correlating a sequence of chip samples comprising: 1) a memory for storing the chip samples; 2) a plurality of add-subtract cells, each add-subtract cell receiving a plurality of real bits, a, and a plurality of imaginary bits, b, from a first chip sample; and 3) a plurality of sign select units. Each sign select units receives from one add-subtract cells a first input equal to a sum (a+b) of the real bits, a, and the imaginary bits, b, and a second input equal to a difference (a−b) of the real bits, a, and the imaginary bits, b. Each sign select unit generates a real output and an imaginary output, wherein each of the real and imaginary outputs is equal to one of: 1) the sum (a+b) multiplied by one of +1 and −1 and 2) the difference (a−b) multiplied by one of +1 and −1.

20 Claims, 13 Drawing Sheets

| EVENT | START | S1 | S2 | S3 | S4 | S5 | S6 | S7 | S8 | S9 | S10 |
|---|---|---|---|---|---|---|---|---|---|---|---|
| E1 | S1 | S9 | S4 | S2 | | | | | | | S8 |
| E2 | | S2 | | S2 | | S4 | | | S10 | | |
| E3 | | S2 | | | | | | | | | |
| E4 | | S10 | | S5 | | | | S9 | | | S8 |
| E5 | | | S9 | | S9 | S3 | S9 | | | S10 | |
| E6 | | | | | S2 | S5 | S5 | | | | S7 |
| E7 | | | | S2 | | | S6 | | | | STOP |

| CG (Re) | CG (iM) | OUTPUT (Re) | INPUT (Im) |
|---|---|---|---|
| 0 | 0 | a + b | -a + b |
| 0 | 1 | a - b | a + b |
| 1 | 0 | -a + b | -a - b |
| 1 | 1 | -a - b | a - b |

805,855

CORRELATION ARCHITECTURE FOR USE IN SOFTWARE-DEFINED RADIO SYSTEMS

CROSS-REFERENCE TO RELATED APPLICATIONS AND CLAIM OF PRIORITY

The present invention is related to those disclosed in U.S. Prov. Pat. No. 60/653,968, filed Feb. 17, 2005, entitled "Context-Based Operation Reconfigurable Instruction Set Processor", and U.S. Prov. Pat. No. 60/654,035, filed Feb. 17, 2005, entitled "Correlation Architecture For Software Defined Radio". Prov. Pat. Nos. 60/653,968 and 60/654,035 are assigned to the assignee of the present application and are incorporated by reference into the present disclosure. The present application claims priority under 35 U.S.C. §119(e) to U.S. Provisional Patent Nos. 60/653,968 and 60/654,035.

The present application is a continuation-in-part of U.S. patent application Ser. No. 11/123,313, filed on May 6, 2005, entitled "Context-based Operation Reconfigurable Instruction Set Processor and Method of Operation." application Ser. No. 11/123,313 is assigned to the assignee of the present application and is incorporated by reference into the present application as if fully set forth herein. The present application claims priority under 35 U.S.C. §120 to U.S. patent application Ser. No. 11/123,313.

TECHNICAL FIELD OF THE INVENTION

The present invention relates generally to wireless communication devices and, more specifically, to a correlation unit for use in software-defined radio (SDR) communication devices.

BACKGROUND OF THE INVENTION

Data processors are used in nearly every type of modern electronic device, including consumer electronics, industrial machinery, scientific apparatuses and communication networks. However, the performance and degree of complexity of the data processors (or microprocessors) used in different applications may vary widely. The speed and power requirements of a particular application are important in determining the type of data processor used.

The type of data processor used is particularly important in software-defined radio (SDR) implementations. An SDR device uses reconfigurable hardware that may be programmed over the air to operate under different wireless protocols. For example, an SDR transceiver in a wireless laptop computer may be configured by a first software load to operate in an IEEE-802.11x wireless network and may be reconfigured by a second software load to operate in a CDMA2000 wireless network.

There are six main types of data processors in common use: 1) digital signal processors, 2) reduced instruction set computers, 3) complex instruction set computers, 4) field programmable gate arrays, 5) application specific integrated circuits, and 6) application specific instruction set processors. Each of these types of data processors has particular advantages and particular disadvantages.

A digital signal processor (DSP) is a general-purpose processor optimized to efficiently execute digital signal processing operations, such as a Multiply-Accumulate operation for finite impulse response (FIR) filtering and Fast Fourier Transform (FFT) operations. A DSP implements many sophisticated addressing modes to cover many of the DSP calculation requirements, such as bit reverse addressing mode for FFT, index addressing for FIFO devices, and the like. Examples of DSPs include: 1) the Motorola 56000, 56300, SC81xx, and MRC6011 processors; 2) the Texas Instruments (TI) C55, C6203, C6416, and C67xx processors; 3) the ADI Sharc and TigerSharc processors; and 4) the Morpho MS1-64 Reconfigurable DSP.

A reduced instruction set computer (RISC) is a general purpose processor (GPP) that mainly targets control applications, such as media access control (MAC) applications. The main advantage of the RISC machine is its simplicity. As its name, A RISC processor has small instruction set, which provides more code density as well as faster change-of-flow reaction. Examples of RISC devices include: 1) ARM processors (e.g., ARM926, ARM1136J); 2) MIPS processors (e.g., MIPS32, MIPS64); 3) the IBM PowerPC 405 and 750FX; and 4) the Motorola PowerPC 603.

A complex instruction set computer (CISC) device is a general purpose processor (GPP) targeted to the general purpose applications ranging from multimedia applications to PC applications. Examples of CISC processors include: 1) the Intel Pentium; and 2) the Motorola 68000.

The field programmable gate array (FPGA) is a reconfigurable hardware device based on an array of hardware cells connected through long busses and local busses. FPGA devices are quite commonly used in wireless network base station applications and prototypes. Examples of FPGA devices include: 1) the Xilinx Virtex IV; and 2) the Altera Stratix II.

An application specific integrated circuit (ASIC) is a hardware device specially designed for a specific application. An ASIC is usually very power efficient. ASIC devices are used in many wireless devices (i.e., cell phones, etc.). An application specific instruction set processor (ASIP) is an enhanced version of an ASIC device that adds more programmability to the ASIC hardware.

Each of the above-described processors has certain advantages and suffers from particular disadvantages. Digital signal processors are the most flexible type of processor, from a software point of view, in order to meet software-defined radio (SDR) requirements. However, DSP devices do not have enough MIPS performance and bit manipulation architecture to meet 3G and 4G bit-rate processing requirements. RISC processors target control applications, but are inadequate beyond baseband applications for wireless network implementations. CISC processors may have the flexibility and the MIPS performance to process baseband applications, but their poor power efficiency makes them unsuitable for handset power restrictions. FPGA devices, like CISC processors, may meet the required MIPS performance, but their poor power efficiency makes them unsuitable for handset designs.

ASIC devices are well matched to the power and cost restrictions of handset designs. However, their flexibility is too limited to make them suitable for SDR implementations. ASIP devices achieve greater flexibility than ASIC devices by adding more programmability to the application specific hardware and by introducing instruction-set processors to the hardware. However, since ASIPs are general-purpose devices, their processor core efficiency depends on the application being processed. The more control code in the application, the less efficient the ASIP will be. This results in poor performance and higher power consumption.

Additional disadvantages of the prior art processors are scalability and modularity. The software-defined radio (SDR) approach was created in order to minimize cost (design time, TTM) and power consumption and to maximize flexibility. The prior art processor implementations fail to provide an optimized combination of scalability and modularity.

Designing data processors for use in mobile stations is inherently difficult due to the tradeoffs that must always be made between competing considerations, including energy efficiency, computation power, and flexibility. Most current multi-standard wireless devices comprise blocks of separate and largely independent ASIC devices, each of which is related to a different wireless standard. The separate ASIC devices are stacked together in order to provide support for several wireless standards simultaneously. This brute-force method incurs severe penalties due to increased die size, increased power, and lack or flexibility. On the other hand, general purpose DSPs and similar architectures have a lot of flexibility. However, these devices have high power consumption and typically cannot meet the real-time computation requirements of most wireless standards.

Conventional mobile stations (or wireless terminals) are based on multiple ASIC devices because of power and performance considerations. As noted, these ASIC devices are normally dedicated to only particular functions in the system. For example, in most conventional wideband code division multiple access (WCDMA) mobile stations, separate ASIC blocks are typically used for the correlator function and for the cell search function, even though both blocks are very similar. If both functions could be implemented using the same reconfigurable hardware to the greatest degree possible, such as solution would be more power efficient and would use less die size.

Therefore, there is a need in the art for an improved software-defined radio (SDR) architecture that minimizes cost and power consumption while maintaining flexibility. In particular, there is a need for a reconfigurable correlation unit for use in software-defined radio (SDR) wireless devices.

SUMMARY OF THE INVENTION

The present invention provides a re-configurable correlation unit that may be implemented in a context-based operation reconfigurable instruction set processor, as disclosed in U.S. patent application Ser. No. 11/123,313, incorporated by reference above. A correlation unit according to the principles of the present invention matches the architecture to the domain of application and optimizes the performance and power jointly. Thus, the present invention simultaneously meets the real-time processing requirements and low-power requirements of wireless mobile stations. Advantageously, the correlation unit is highly re-configurable and may be used for different functional blocks operating under different standards in a CRISP, including CDMA system de-spreading, IEEE-802.11b CCK demodulation, WCDMA de-spreading, cell search, HSDPA de-spreading, and the like.

To address the above-discussed deficiencies of the prior art, it is a primary object of the present invention to provide a re-configurable correlation unit for correlating a sequence of chip samples. According to an advantageous embodiment of the present invention, the re-configurable correlation unit comprises: 1) a memory for storing the sequence of chip samples; 2) a plurality of add-subtract cells, wherein each of the add-subtract cells is capable of receiving a plurality of real bits, a, from a first chip sample in the memory and a plurality of imaginary bits, b, from the first chip sample; and 3) a processing unit comprising a plurality of sign select units. Each of the plurality of sign select units receives from one of the plurality of add-subtract cells a first input equal to a sum (a+b) of the plurality of real bits, a, and the plurality of imaginary bits, b, and a second input equal to a difference (a−b) of the plurality of real bits, a, and the plurality of imaginary bits, b. Each sign select unit generates a real output and an imaginary output, wherein each of the real output and the imaginary output is equal to one of: 1) the sum (a+b) multiplied by one of +1 and −1 and 2) the difference (a−b) multiplied by one of +1 and −1.

According to one embodiment of the present invention, the correlation unit further comprises a code generator for generating a sequence of code bits, wherein the each sign select unit receives a real code bit and an imaginary code bit from the sequence and wherein the real and imaginary code bits determine a value of the real output and a value of the imaginary output of the each sign select unit.

According to another embodiment of the present invention, the processing unit further comprises a first stage of adders comprising a first plurality of real adders and a first plurality of imaginary adders.

According to still another embodiment of the present invention, each of the first plurality of real adders receives a first real output from one of the plurality of sign select units and a second real output from another one of the plurality of sign select units and produces a real sum output.

According to yet another embodiment of the present invention, each of the first plurality of imaginary adders receives a first imaginary output from one of the plurality of sign select units and a second imaginary output from another one of the plurality of sign select units and produces an imaginary sum output.

According to a further embodiment of the present invention, the processing unit further comprises a second stage of adders comprising at least one real adder and at least one imaginary adder.

According to a still further embodiment of the present invention, each of the at least one real adder in the second stage receives a first real sum output from one of the first plurality of real adders and a second real sum output from another one of the first plurality of real adders and produces a real sum output.

According to a yet further embodiment of the present invention, each of the at least one imaginary adder in the second stage receives a first imaginary sum output from one of the first plurality of imaginary adders and a second imaginary sum output from another one of the first plurality of imaginary adders and produces an imaginary sum output.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 2 illustrates a finite state machine (FSM) table for a data processor;

DETAILED DESCRIPTION OF THE INVENTION

FIGS. 1 through 12, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
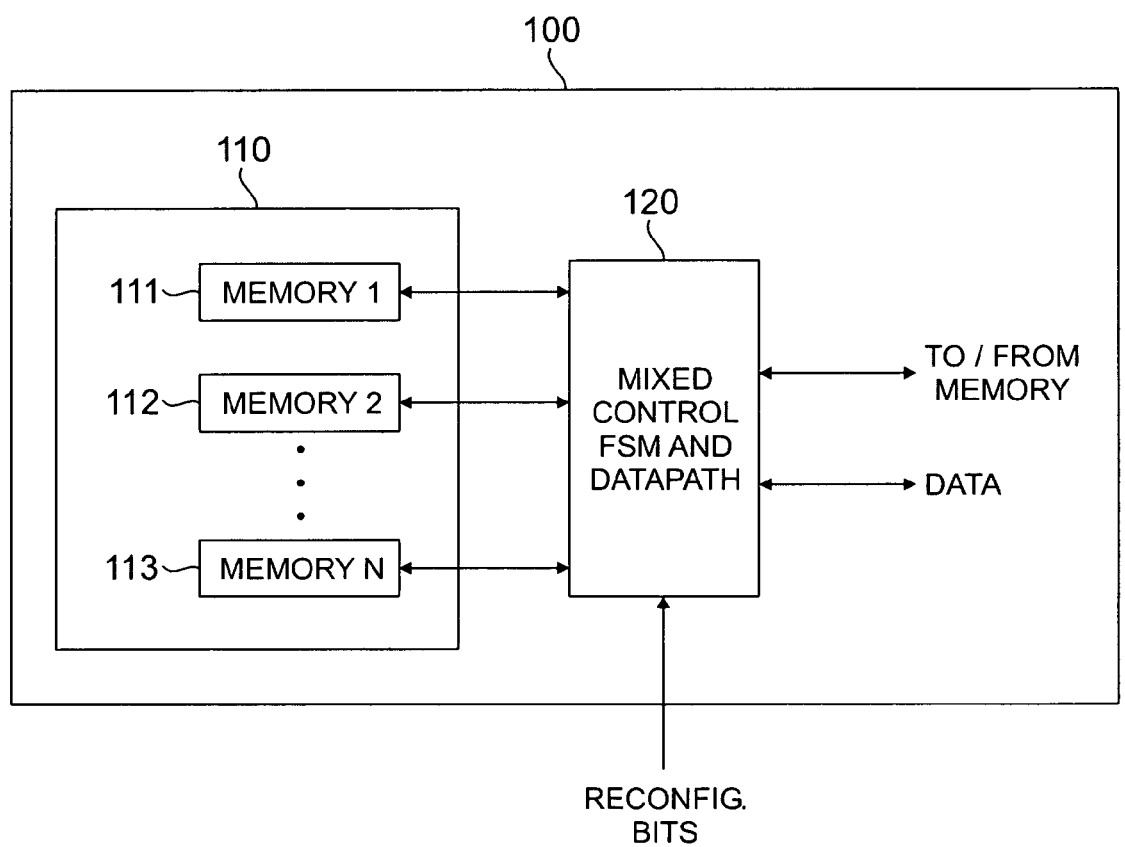
FIG. 1 is a block diagram of a conventional data processor according to an exemplary embodiment of the prior art.

FIG. 1 is a high-level block diagram of conventional data processor 100 according to an exemplary embodiment of the prior art. FIG. 1 depicts a general implementation of an application in hardware and software. Data processor 100 comprises memory 110 and control circuitry 120. Control circuitry 120 further comprises mixed control finite state machine (FSM) circuitry and datapath circuitry. Memory 110 further comprises N memory blocks, including exemplary memory blocks 111-113, which are arbitrarily labeled Memory 1, Memory 2, and Memory N.

Any data processor application may be regarded as a set of datapaths controlled and scheduled by a finite state machine (FSM), as FIG. 1 shows. A finite state machine receives input events and, in response, transitions between states and/or generates outputs. The FSM decides to which states to transition based on the current state and the received input events.

FIG. 2 illustrates finite state machine (FSM) table 200 for an exemplary data processor. FSM table 200 depicts the next state transitions performed by a FSM based on the current state (i.e., one of states S1-S10) and the received input event (i.e., one of events E1-E7). Initially, the FSM is in state S1. The column for state S1 indicates the state transitions for state S1 in response to events E1-E4.

In response to event E1 received during state S1, the FSM transitions from state S1 to state S9. In response to event E2 received during state S1, the FSM transitions from state S1 to state S2. In response to event E3 received during state S1, the FSM transitions from state S1 to state S2. In response to event E4 received during state S1, the FSM transitions from state S1 to state S10.

As FIG. 2 makes clear, there are many holes in the FSM table 200 for which no values are given. For example, for state S1, no values are given for events E5-E7. In prior art data processors, those holes, although they do not contribute to the flow of the finite state machine, must be provided for, otherwise the finite state machine will not work correctly. In the prior art data processors, the finite state machines cannot be further optimized to eliminate these holes.

Figure 3:
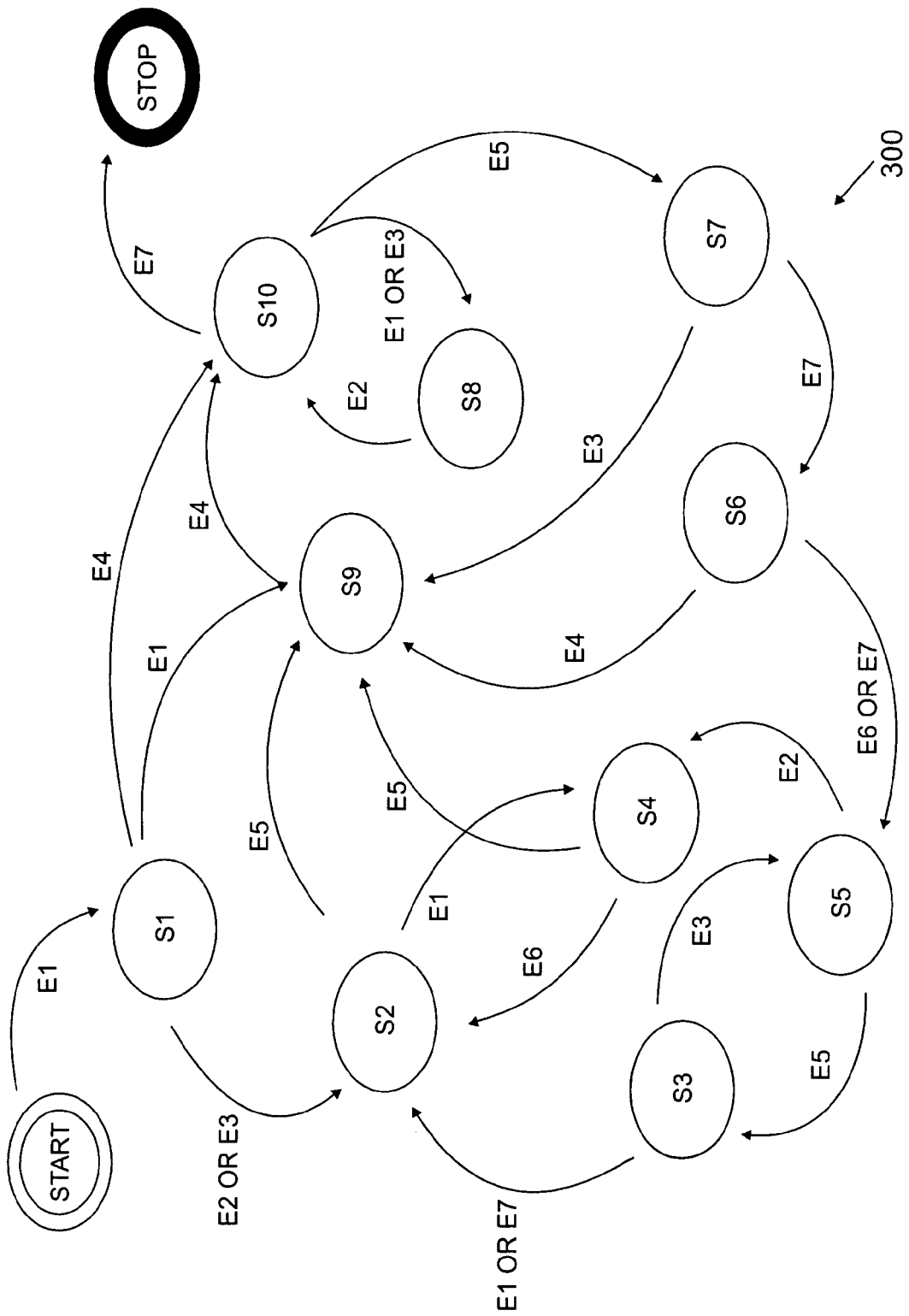
FIG. 3 is a bubble diagram corresponding to the finite state machine table in FIG. 2.

FIG. 3 illustrates bubble diagram 300, which corresponds to the finite state machine table in FIG. 2. Each of states S1-S10 is represented by a bubble and events E1-E7 cause transitions between states. These transitions are represented by the arrowed lines connecting the state bubbles. The arrowhead determines the direction of the transition.

Figure 4:
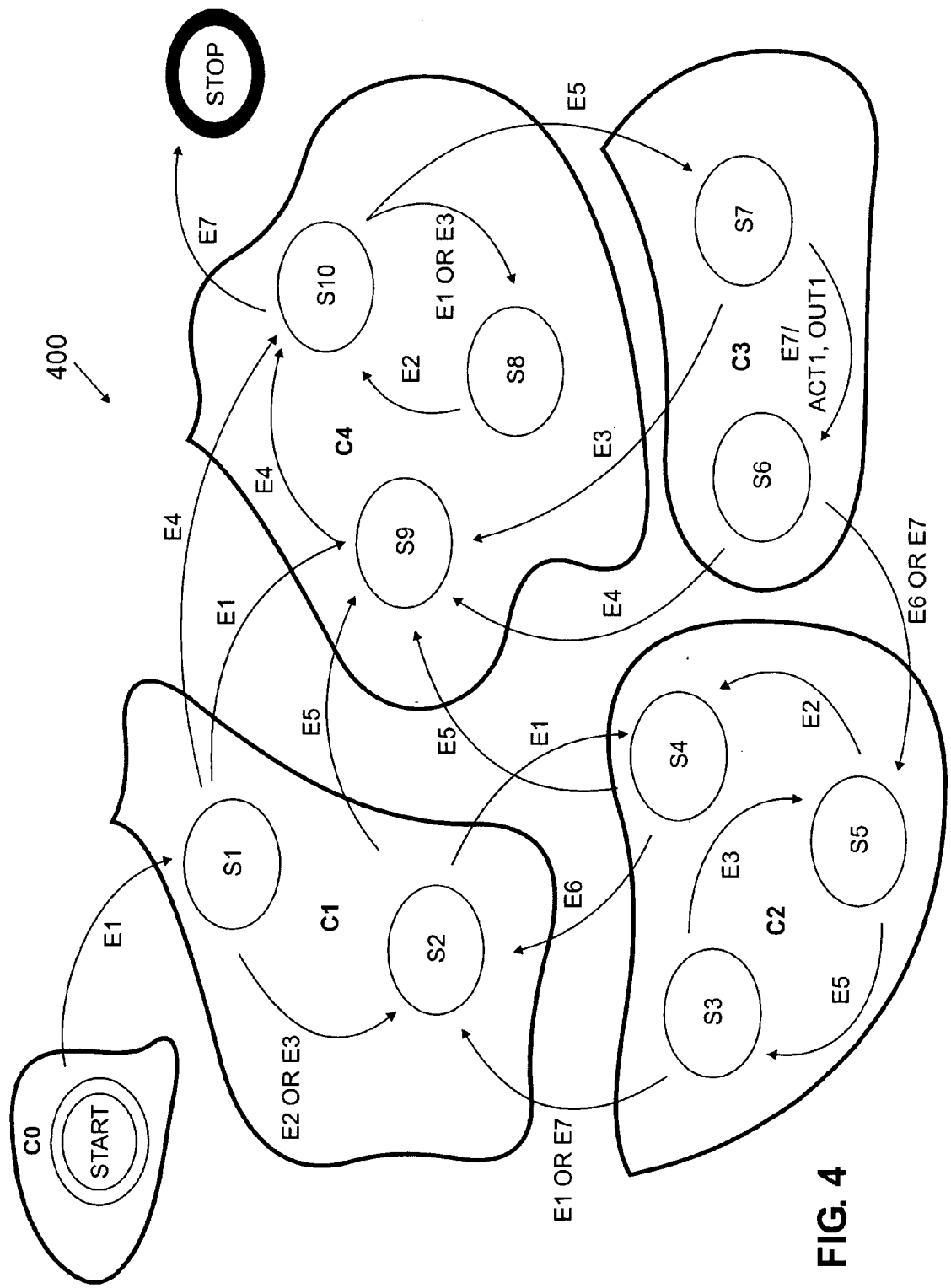
FIG. 4 is a bubble diagram showing context-based groupings of states in the finite state machine table in FIG. 2 according to an exemplary embodiment of the present invention.

It is noted that in bubble diagram 300, it is possible to group states according to contexts of execution units. For the purposes of this disclosure, a context is a group of operations and/or instructions that are related to the same function. FIG. 4 illustrates bubble diagram 400, in which states of the finite state machine table in FIG. 2 that are related to the same context are grouped together according to the principles of the present invention. The groupings of states form contexts C0, C1, C2, C3 and C4.

Each of the groupings of states in FIG. 4 may be used to create a context-based operation reconfigurable instruction set processor (CRISP) according to the principles of the present invention. Each of contexts C0-C4 comprises a minimum number of input events and a set of probable operations. Each context also has its own data path, which may comprise parallel execution units while the instruction set execution may be either in a VLIW, SIMD, microcode or other known implementation manner to increase the overall performance.

Figure 5:
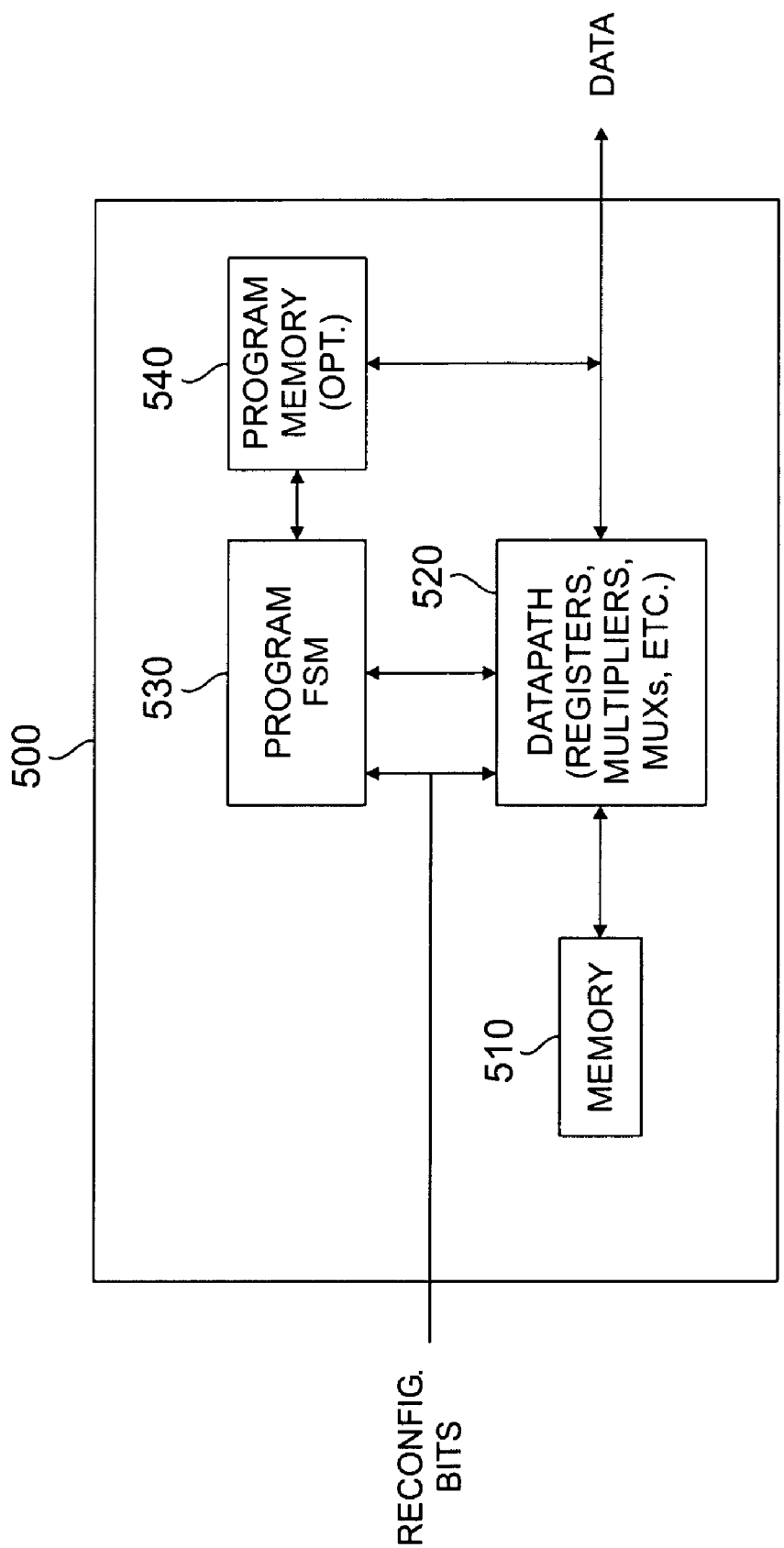
FIG. 5 is a high-level block diagram of a context-based operation reconfigurable instruction set processor according to an exemplary embodiment of the present invention.

FIG. 5 is a high-level block diagram of context-based operation reconfigurable instruction set processor (CRISP) 500, according to an exemplary embodiment of the present invention. CRISP 500 comprises memory 510, programmable data path circuitry 520, programmable finite state machine 530, and optional program memory 540. CRISP 500 is designed to implement only a subset of context-related instructions from FIG. 4 in an optimum manner. Each of the contexts C0-C4 in FIG. 4 may be implemented by a separate CRISP similar to CRISP 500. Context-based operation reconfigurable instruction set processor (CRISP) 500 defines the generic hardware block that usually consists of higher level hardware processor blocks. The principle advantage to CRISP 500 is that CRISP 500 breaks down the required application into two main domains, a control domain and a data path domain, and optimize each domain separately. By implementing a data processor application, such as a mobile station handset (e.g., cell phone, wireless laptop), using CRISP 500, the present invention at least partially overcomes the flexibility vs. power problems that adversely affect conventional data processor applications.

The control domain is implemented by programmable finite state machine 530, which may comprise a DSP, an MCU or another prior art device. Programmable FSM 530 is configured by reconfiguration bits received from an external controller (not shown). Programmable FSM 530 may execute a program stored in associated optional program memory 540. The program may be stored in program memory 540 via the DATA line from an external controller (not shown). Memory 510 is used to store application data used by data path circuitry 520.

Programmable data path circuitry 520 is divided into a set of building blocks that perform particular functions (e.g., registers, multiplexers, multipliers, and the like). Each of building blocks is both reconfigurable and programmable to allow maximum flexibility. The criteria for dividing programmable data path circuitry 520 into functional blocks depends on the level of reconfigurability and programmability required for a particular application.

Since each of the contexts C0-C4 in FIG. 4 is implemented by a separate CRISP 500 that works independently of other CRISPs, the present invention provides an efficient power management scheme that is able to shut down a CRISP when the CRISP is not required to execute. This assures that only the CRISPs that are needed at a given time are active, while other idle CRISPs do not consume any significant power.

A CRISP according to the principles of the present invention may be targeted to many applications, including, but not limited to, baseband applications in wireless devices and multimedia applications. In many applications, these contexts may be loosely-coupled independent contexts that may run concurrently with either minimum or no dependencies.

Figure 6:
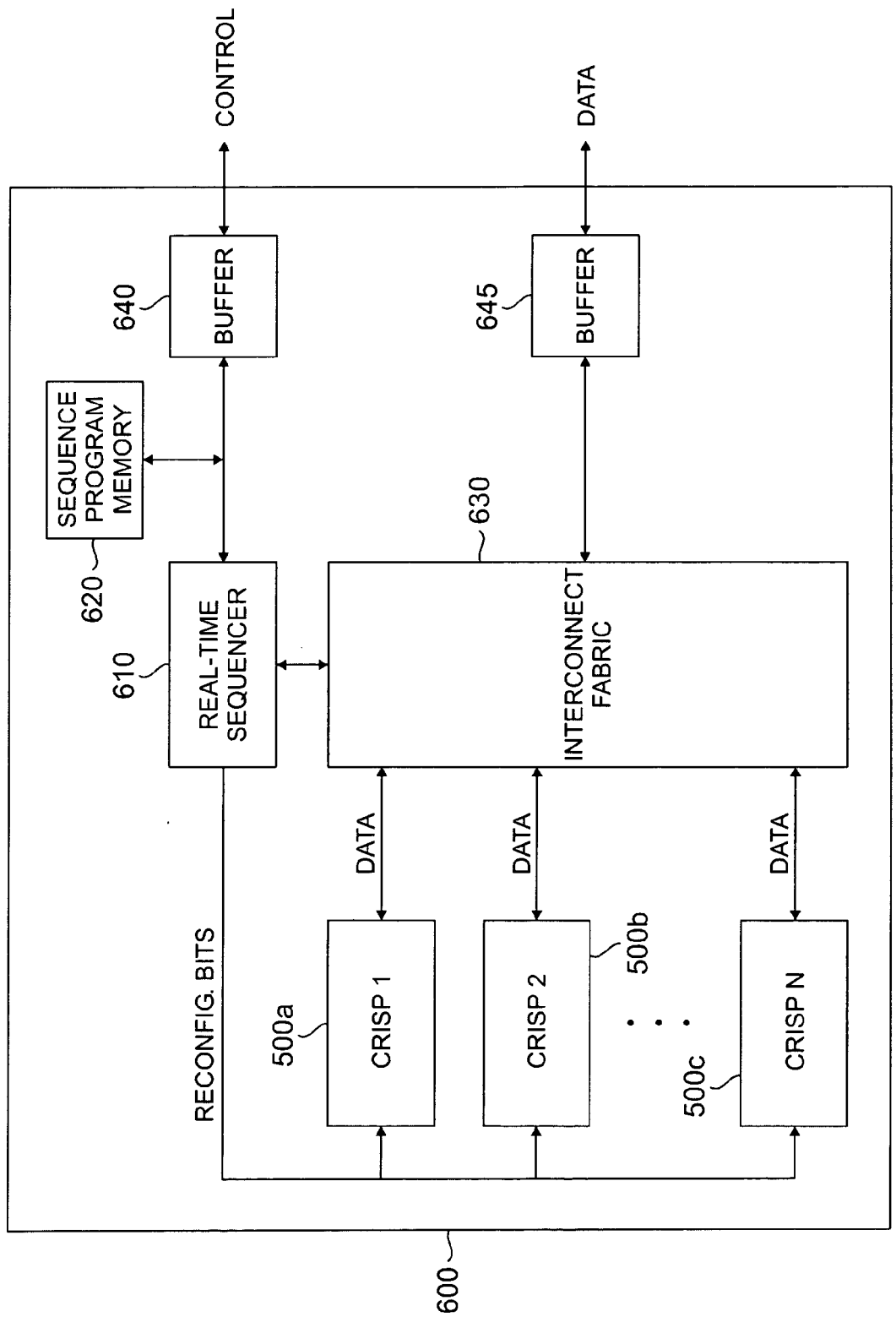
FIG. 6 is a high-level block diagram of a reconfigurable processing system comprising a plurality of context-based operation reconfigurable instruction set processors according to an exemplary embodiment of the present invention.

FIG. 6 is a high-level block diagram of reconfigurable processing system 600 according to an exemplary embodiment of the present invention. Reconfigurable processing system 600 comprises N context-based operation reconfigurable instruction set processors (CRISPs), including exemplary CRISPs 500a, 500b, and 500c, which are arbitrarily labeled CRISP 1, CRISP 2 and CRISP N. Reconfigurable processing system 600 further comprises real-time sequencer 610, sequence program memory 620, programmable interconnect fabric 630, and buffers 640 and 645.

Reconfiguration bits may be loaded into CRISPs 500a, 500b, and 500c from the CONTROL line via real-time sequencer 610 and buffer 640. A control program may also be loaded into sequence program memory 620 from the CONTROL line via buffer 640. Real-time sequencer sequences the contexts to be executed by each one of CRISPs 500a-c by retrieving program instructions from program memory 620 and sending reconfiguration bits to CRISPs 500a-c. In an exemplary embodiment, real-time sequencer 610 may comprise a stack processor, which is suitable to operate as a real-time scheduler due to its low latency and simplicity.

Reconfigurable interconnect fabric 630 provides connectively between each one of CRISPs 500a-c and an external DATA bus via bi-directional buffer 645. In an exemplary embodiment of the present invention, each one of CRISPs 500a-c may act as a master of reconfigurable interconnect fabric 630 and may initiate address access. The bus arbiter for reconfigurable interconnect fabric 630 may be internal to real-time sequencer 610.

In an exemplary embodiment, reconfigurable processing system 600 may be, for example, a cell phone or a similar wireless device, or a data processor for use in a laptop computer. In a wireless device embodiment implemented according to a software-defined radio (SDR) principles, each one of CRISPs 500a-c is responsible for executing a subset of context-related instructions that are associated with a particular reconfigurable function. For example, CRISP 500a may be configured to execute context-related instructions that process CDMA baseband signals or OFDMA baseband signals. CRISP 500b may be configured to execute context-related instructions that act as a memory controller. CRISP 500c may be configured to execute context-related instructions that perform MPEG-4 processing for multimedia applications.

A CRISP according to the principles of the present invention provides a new way of implementing reconfigurable hardware acceleration techniques. The present invention provides reconfigurability and programmability with minimum sacrifice on power efficiency. Since the CRISPs are largely independent and may be run simultaneously, the present invention has the performance advantage of parallelism without incurring the full power penalty associated with running parallel operations. The loose coupling and independence of CRISPs allows them to be configured for different systems and functions that may be shut down separately.

Figure 7:
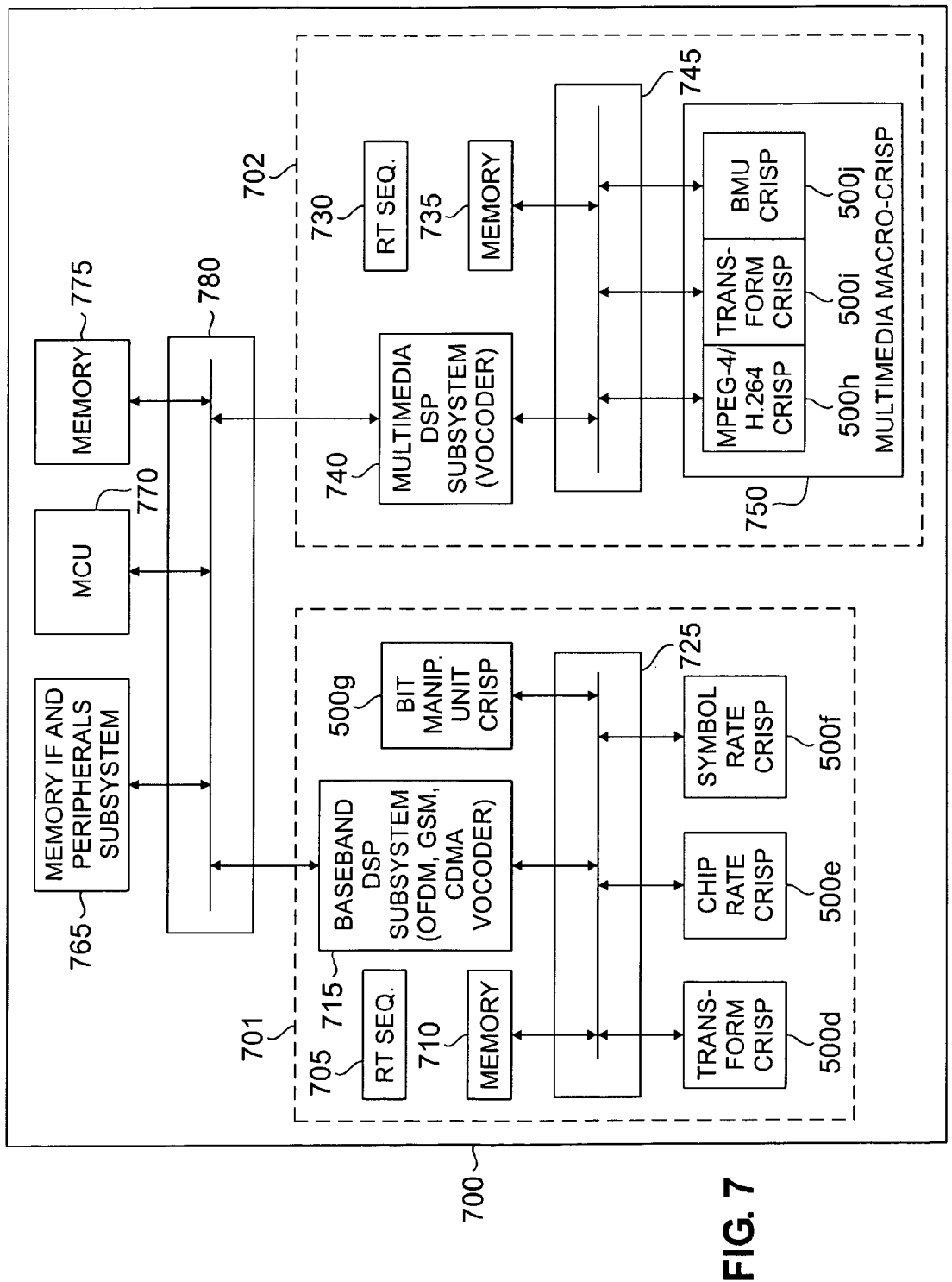
FIG. 7 is a high-level block diagram of a multi-standard software-defined radio (SDR) system comprising a plurality of context-based operation reconfigurable instruction set processors according to one embodiment of the present invention.

FIG. 7 is a high-level block diagram of multi-standard software-defined radio (SDR) system 700, which comprises a plurality of context-based operation reconfigurable instruction set processors according to one embodiment of the present invention. SDR system 700 may comprise a wireless terminal (or mobile station) that accesses a wireless network, such as, for example, a GSM or CDMA cellular telephone, a PDA with WCDMA or IEEE-802.11x capabilities, or the like.

Multi-standard SDR system 700 comprises baseband subsystem 701, applications subsystem 702, memory interface (IF) and peripherals subsystem 765, main control unit (MCU) 770, memory 775, and interconnect 780. MCU 770 may comprise, for example, a conventional microcontroller or a microprocessor (e.g., x86, ARM, RISC, DSP, etc.). Memory IF and peripherals subsystem 765 may connect SDR system 700 to an external memory (not shown) and to external peripherals (not shown). Memory 775 stores data from other components in SDR system 700 and from external devices (not shown). For example, memory 775 may store a stream of incoming data samples received from an external antenna system and an RF down-converter associated with SDR system 700. Interconnect 780 provides data transfer between subsystems 701 and 702, memory IF and peripherals subsystem 765, MCU 770, and memory 775.

Baseband subsystem 701 comprises real-time (RT) sequencer 705, memory 710, baseband DSP subsystem 715, interconnect 725, and a plurality of special purpose context-based operation instruction set processors (CRISPs), including transform CRISP 500d, chip rate CRISP 500e, symbol rate CRISP 500f, and bit manipulation unit (BMU) CRISP 500g. By way of example, transform CRISP 500d may implement a Fast Fourier Transform (FFT) function, chip rate CRISP 500e may implement a correlation function for a CDMA signal, and symbol rate CRISP 500f may implement a Viterbi decoder function.

In such an exemplary embodiment, transform CRISP 500d may receive samples of an intermediate frequency (IF) signal stored in memory 775 and perform an FFT function that generates a sequence of chip samples at a base band rate. Next, chip rate CRISP 500e receives the chip samples from transform CRISP 500d and performs a correlation function that generates a sequence of data symbols. Next, symbol rate CRISP 500f receives the symbol data from chip rate CRISP 500e and performs Viterbi decoding to recover the baseband user data. The baseband user data may then be used by applications subsystem 702.

In an exemplary embodiment of the present invention, symbol rate CRISP 500f may comprise two or more CRISPs that operate in parallel. Also, by way of example, BMU CRISP 500g may implement such functions as variable length coding, cyclic redundancy check (CRC), convolutional encoding, and the like. Interconnect 725 provides data transfer between RT sequencer 705, memory 710, baseband DSP subsystem 715 and CRISPs 500d-500g.

Applications subsystem 702 comprises real-time (RT) sequencer 730, memory 735, multimedia DSP subsystem 740, interconnect 745, and multimedia macro-CRISP 750. Multimedia macro-CRISP 750 comprises a plurality of special purpose context-based operation instruction set processors, including MPEG-4/H.264 CRISP 500h, transform CRISP 500i, and BMU CRISP 500j. In an exemplary embodiment of the present invention, MPEG-4/H.264 CRISP 550h performs motion estimation functions and transform CRISP 500i performs a discrete cosine transform (DCT) function. Interconnect 745 provides data transfer between RT sequencer 730, memory 735, multimedia DSP subsystem 740, and multimedia macro-CRISP 750.

In the exemplary embodiment shown in FIG. 7, the use of CRISP devices enables applications subsystem 702 of multi-standard SDR system 700 to be reconfigured to support multiple video standards with multiple profiles and sizes. Additionally, the use of CRISP devices enables baseband subsystem 701 of multi-standard SDR system 700 to be reconfigured to support multiple air interface standards. Thus, SDR system 700 is able to operate in different types of wireless networks (e.g., CDMA, GSM, 802.11x, etc.) and can play different types of video and audio formats. However, the use of CRISPS according to the principles of the present invention enables SDR system 700 to perform these functions with much lower power consumption than conventional wireless devices having comparable capabilities.

More particularly, the present invention provides a re-configurable correlation unit that may be implemented in a context-based operation reconfigurable instruction set processor. Advantageously, a correlation unit according to the principles of the present invention is highly re-configurable and may be used for different functional blocks operating under different standards, including CDMA de-spreading, IEEE-802.11b CCK demodulation, WCDMA de-spreading, cell search, HSDPA de-spreading, and the like.

Figure 8:
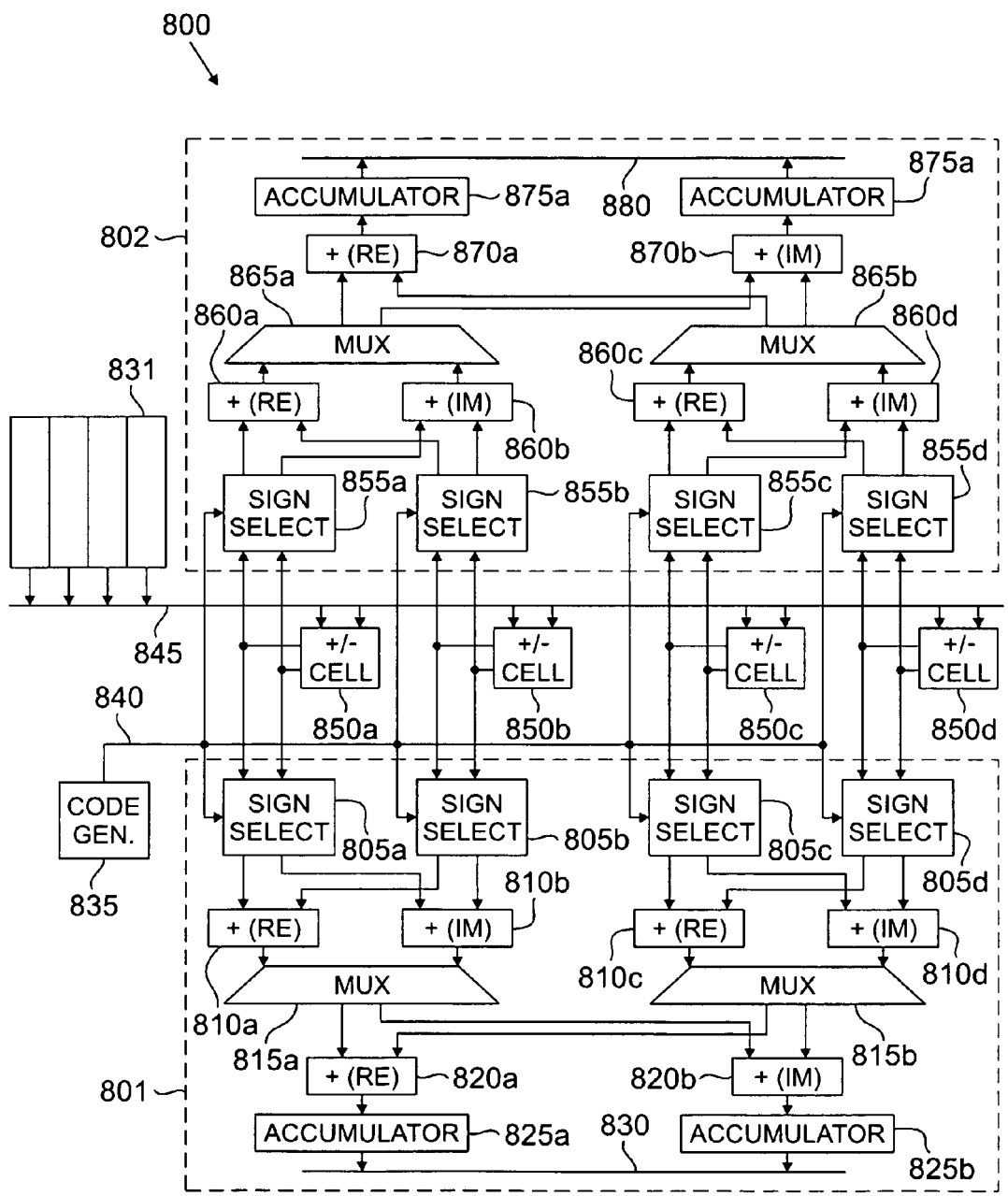
FIG. 8 is a block diagram of a correlation unit according to one embodiment of the present invention.

FIG. 8 is a block diagram of reconfigurable correlation unit 800 according to one embodiment of the present invention. Correlation unit 800 may be implemented as part of chip rate CRISP 500e, for example. Correlation unit 800 comprises three main parts: data memory 831, code generator (CG) 835, and a processing unit. In the exemplary embodiment, the processing unit is implemented as two substantially identical processing sub-blocks, namely lower processing unit (PU) 801 and upper processing unit (PU) 802. Correlation unit 800 further comprises code bus 840, data bus 845, and four add-subtract (+/−) cells, namely add-subtract cells 850a-850d.

Lower processing unit 801 comprises four sign select units, namely sign select units 805a-805d, four first stage adders, namely adders 810a-810d, multiplexers (MUXes) 815a and 815b, two second stage adders, namely adders 820a and 820b, accumulators 825a and 825b, and output bus 830. Upper processing unit 802 comprises four sign select units, namely sign select units 855a-855d, four first stage adders, namely adders 860a-860d, multiplexers (Muxes) 865a and 865b, two second stage adders, namely adders 870a and 870b, accumulators 875a and 875b, and output bus 880.

Lower processing unit 801 and upper processing unit 802 operate independently. According to an exemplary embodiment of the present invention, code bus 840, data bus 845, and output buses 830 and 880 are unidirectional buses. Furthermore, in an advantageous embodiment of the present invention, output bus 830 and output bus 880 may be the same bus. For this reason, output bus 830 and output bus 880 will hereafter be referred to only as "output bus 830". Data bus 845 sends the chip sample data from data memory 831 to processing units 801 and 802 via cells 850a-850d. Output bus 830 writes output data from accumulators 825a and 825b and accumulators 875a and 875b to data memory 831. Code bus 840 conveys the code data generated in code generator 835 to processing units 801 and 802.

It should be noted that processing units 801 and 802, memory 831, code generator 835, and buses 830, 840, 845 and 880 may be configured for different standards and functions, including CDMA de-spreading, IEEE-802.11b CCK demodulation, WCDMA de-spreading, cell search, HSDPA de-spreading, and the like. Furthermore, each of the functional components and each of the buses may be shut down independently. The number of cells 850, the width of data memory 831, and the number of sign select units 805 and 855 illustrated and described in FIG. 8 are by way of example only. As will be seen below, the number of processing units 801 and 802 and the sizes of cells 850, data memory 831, and sign select units 805 and 855 may be varied (e.g., increased or decreased) without departing from the scope of the invention.

Figure 9:
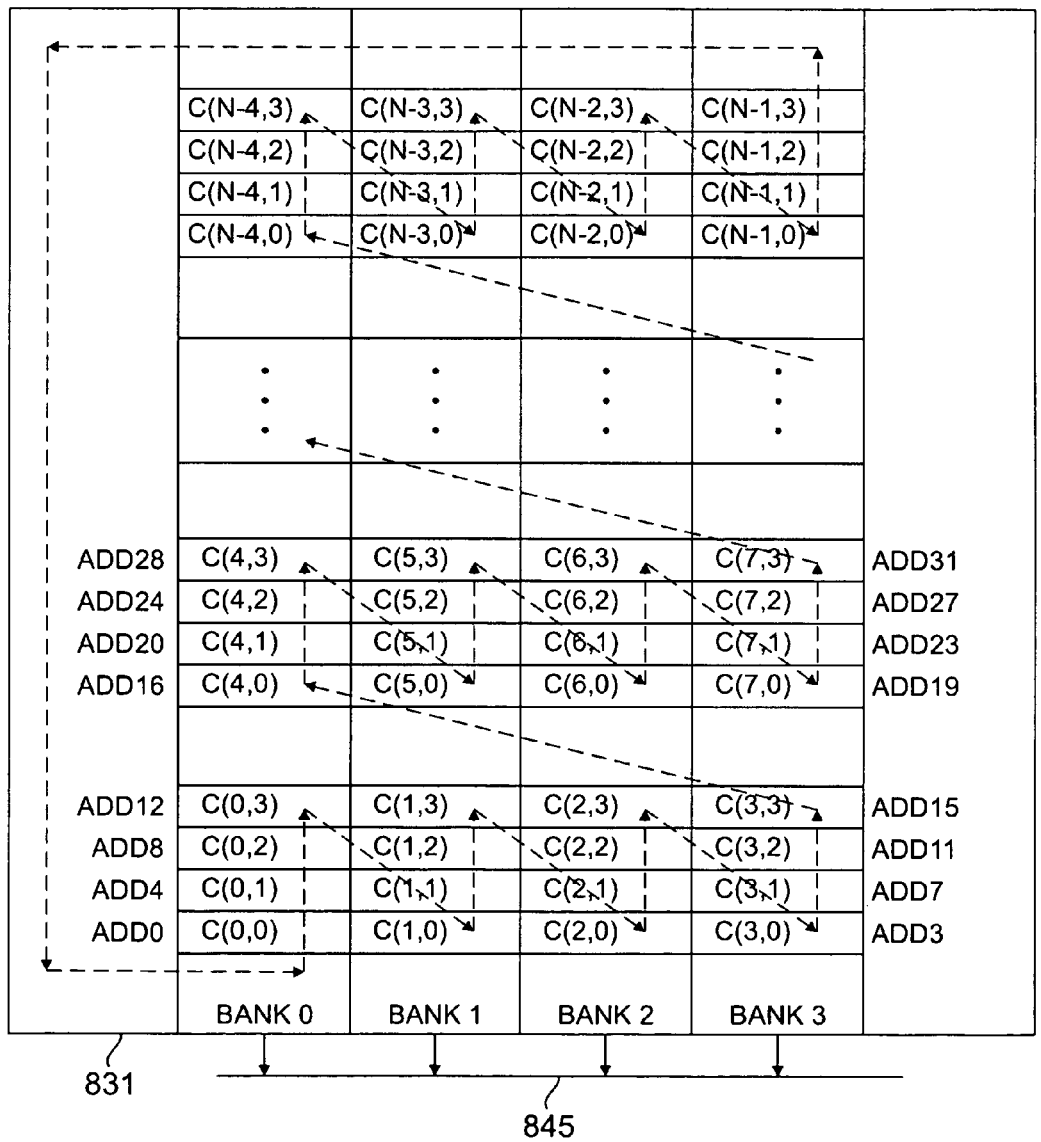
FIG. 9 is a block diagram of the memory in the correlation unit according to one embodiment of the present invention.

FIG. 9 is a block diagram of data memory 831 in correlation unit 800 according to one embodiment of the present invention. Chip samples are captured from the down-converted RF signal in the receiver front-end (not shown) and are stored into four memory banks, namely Bank 0, Bank 1, Bank 2 and Bank 3, in memory 831. The order and manner in which the chip samples are stored in memory 831 is indicated by the dotted line arrows. The order and manner vary according to the amount of over-sampling of the chip data.

In FIG. 9, it is assumed that each chip of a CDMA Walsh code is sampled four times and the four samples are written in order into memory 831. Thus, 4×N chip samples from a total of N chips, C(0) through C(N−1), are to be written into memory 831. The first chip, C(0), is sampled four times and the four samples, C(0,0), C(0,1), C(0,2), and C(0,3), are written into addresses ADD0, ADD4, ADD8 and ADD12, respectively, in Bank 0 of data memory 831. Similarly, the second chip, C(1), is sampled four times and the four samples, C(1, 0), C(1,1), C(1,2), and C(1,3), are written into addresses ADD1, ADD5, ADD9 and ADD13, respectively, in Bank 1 of data memory 831. The third chip, C(2), is sampled four times and the four samples, C(2,0), C(2,1), C(2,2), and C(2,3), are written into addresses ADD2, ADD6, ADD10 and ADD14, respectively, in Bank 2 of data memory 831. Finally, the fourth chip, C(3), is sampled four times and the four samples, C(3,0), C(3,1), C(3,2), and C(3,3), are written into addresses ADD3, ADD7, ADD11 and ADD15, respectively, in Bank 3 of data memory 831.

In this manner, the sixteen samples of the first four chips, C(0), C(1), C(2), and C(3), are written into the sixteen addresses from ADD0 to ADD15. This process is repeated as the sixteen samples of the next four chips, C(4), C(5), C(6), and C(7), are written into the next sixteen addresses from ADD16 to ADD31. This process continues until the sixteen samples from the last four chip, C(N−4), C(N−3), C(N−2), and C(N−1), are written into data memory 831.

In the example above, it is assumed that the over-sampling rate is four. However, the sampling rate may vary between different wireless standards. In a different configuration, the over-sampling rate may be eight, in which case eight samples from each chip are written eight deep into memory 831 in a manner similar to that shown in FIG. 9. In another configuration, the over-sampling rate may be two, in which case two samples from each chip are written two deep into memory 831 in a manner similar to that shown in FIG. 9. In still another configuration, the sampling rate may be one per chip, in which case one sample from each chip is written into memory 831 in a manner similar to that shown in FIG. 9.

The width of each chip sample may vary according to the wireless standard (e.g., QPSK, 16 QAM) used and each of the chip samples may comprise both real and imaginary data bits. For example, in a first embodiment of the present invention, each chip sample may be eight bits, including four real bits and four imaginary bits. In a second embodiment of the present invention, each chip sample may be four bits, including two real bits and two imaginary bits.

When the chip samples are to be processed in processing units 801 and 802, four chip samples at a time are read from memory 831 onto data bus 845. For example, during a first read cycle, chip samples C(0,0), C(1,0), C(2,0), C(3,0), are read in parallel from addresses ADD0 through ADD3 in Bank 0, Bank 1, Bank 2 and Bank 3, respectively. During a second read cycle, chip samples C(0,1), C(1,1), C(2,1), C(3,1), are read in parallel from addresses ADD4 through ADD7 in Bank 0, Bank 1, Bank 2 and Bank 3, respectively. Thus, four chip samples at a time are output onto bus 845 until all chip samples are read.

As each chip sample is read from memory 831, it is loaded into one of add-subtract cells 850a-850d. For example during the first read cycle, chip sample C(0,0) is input to add-subtract cell 850a, chip sample C(1,0) is input to add-subtract cell 850b, chip sample C(2,0) is input to add-subtract cell 850c, and chip sample C(3,0) is input to add-subtract cell 850d. During the second read cycle, chip sample C(0,1) is input to add-subtract cell 850a, chip sample C(1,1) is input to add-subtract cell 850b, chip sample C(2,1) is input to add-subtract cell 850c, and chip sample C(3,1) is input to add-subtract cell 850d. Thus, four chip samples at a time are input into add-subtract cells 850a-850d until all chip samples are loaded.

Figures 10A, 10B:
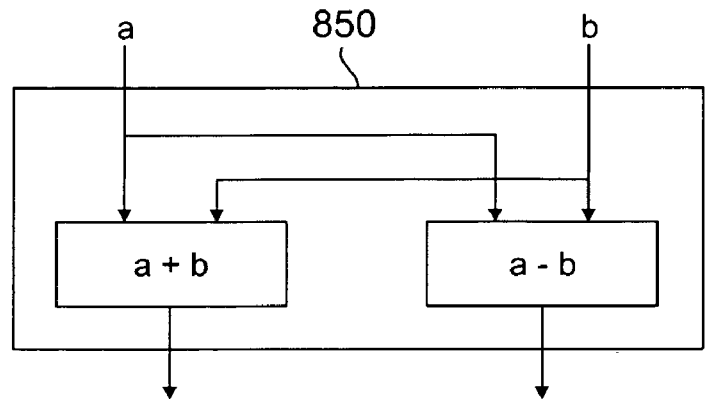
FIG. 10A illustrates an add-subtract cell in greater detail according to an exemplary embodiment of the present invention.
FIG. 10B illustrates a sign select unit in greater detail according to an exemplary embodiment of the present invention.

FIG. 10A illustrates exemplary add-subtract cell 850 in greater detail according to an exemplary embodiment of the present invention. Add-subtract cell 850 comprises an addition unit and a subtraction unit. Add-subtract cell 850 receives two inputs, a and b, and produces the sum (a+b) and the difference (a−b) of the two inputs. In FIG. 10A, the a input of each of add-subtract cells 850a-850d receives the real bits of a chip sample and the b input of each of add-subtract cells 850a-850d receives the imaginary bits of a chip sample.

The sum (a+b) output and the difference (a−b) output from each one of add-subtract cells 850a-850d are then applied to the inputs of a first sign select unit 805 in lower processing unit 801 and a second sign select unit 855 in upper processing unit 802. For example, the sum (a+b) output and the difference (a−b) output from add-subtract cell 850a are both applied to the inputs of sign select unit 805a in lower processing unit 801 and sign select unit 855a in upper processing unit 802. Each sign select also receives from code bus 840 two code bits generated by code generator 835. The sequence of code bits may vary according to the wireless standard for which correlation unit 800 is configured.

In an exemplary embodiment of the present invention, code generator 835 may comprise two components: 1) a scramble code generator and 2) two local circular memories. The scramble code generator is used for some systems, like CDMA. The local circular memories hold spreading codes in CDMA systems. These components may also be used to store some pre-defined patterns, as in a WCDMA cell search. The scramble code generator may be disabled when it is not used. For example, according to an exemplary embodiment of the present invention, the sixteen code bits from code generator 835 may be applied to the eight sign select units 805a-d and 855a-d in the following manner:

$$U_{r0} U_{i0} L_{r0} L_{i0} U_{r1} U_{i1} L_{r1} L_{i1} U_{r2} U_{i2} L_{r2} L_{i2} U_{r3} U_{i3} L_{r3} L_{i3},$$

where $U_{rj}$ is the jth real code bit for upper processing unit 802, $U_{ij}$ is the jth imaginary code bit for upper processing unit 802, $L_{rj}$ is the jth real code bit for lower processing unit 801, and $L_{ij}$ is the jth imaginary code bit for lower processing unit 801. Thus, for example, the first two code bits, $U_{r0}$ and $U_{i0}$, are applied to sign select unit 855a and the next two code bits, $L_{r0}$ and $L_{i0}$, are applied to sign select unit 805a.

FIG. 10B depicts a truth table illustrating the operation of sign select units 805a-d and 855a-d in greater detail according to an exemplary embodiment of the present invention. Each one of sign select units 805a-d and 855a-d receives a sum (a+b) input and a difference (a−b) input from one of add-subtract cells 850a-d. Each one of sign select units 805a-d and 855a-d also receives a real code generator bit, CG(Re), and an imaginary code generator bit, CG(Im). In response, each one of sign select units 805a-d and 855a-d produces a real output, Output(Re), and an imaginary output, Output(Im), according to the value of the real and imaginary code generator bits.

For example, if sign select unit 855a receives the input CG(Re)=$U_{r0}$=1 and the input CG(Im)=$U_{i0}$=0, then the real and imaginary outputs of sign select unit 855a are Output(Re) =(−a+b) and Output(Im)=(−a−b). In essence, each of cells 850a-d produces the sum and difference values (a+b) and (a−b), and then each of sign select units 805a-d and 855a-d multiplies (a+b) and (a−b) by either +1 or −1, depending on the values of the corresponding real and imaginary code generator bits, CG(Re) and CG(Im).

Each of the real and imaginary outputs, Output(Re) and Output(Im), from each sign select unit 805 and 855 are then applied to the first stage adders 810a-d and 860a-d. For example, the real output, Output(Re), from sign select unit 805a is applied to a first input of real (Re) adder 810a and the imaginary output, Output(Im), from sign select unit 805a is applied to a first input of imaginary (Im) adder 810b. Similarly, the real output, Output(Re), from sign select unit 805b is applied to a second input of real (Re) adder 810a and the imaginary output, Output(Im), from sign select unit 805b is applied to a second input of imaginary (Im) adder 810b.

The real and imaginary sums produced by first stage adders 810a-d and 860a-d are then applied to multiplexers 815a-b and 865a-b. For example, MUX 815a receives the real sum produced by adder 810a and receives the imaginary sum produced by adder 810b. Multiplexers 815a and 815b and 865a and 865b then apply either the real sums or the imaginary sums to the second stage adders 820a-b and 870a-b. For example, real (Re) adder 820a receives the real sum produced by adder 810a as a first input from MUX 815a and receives the real sum produced by adder 810c as a second input from MUX 815b. Similarly, imaginary (Im) adder 820b receives the imaginary sum produced by adder 810b as a first input from MUX 815a and receives the imaginary sum produced by adder 810d as a second input from MUX 815b.

In lower processing unit 801, the sum produced by real adder 820a is added to the value in real accumulator 825a and the sum produced by imaginary adder 820b is added to the value in imaginary accumulator 825b. In upper processing unit 802, the sum produced by real adder 870a is added to the value in real accumulator 875a and the sum produced by imaginary adder 870b is added to the value in imaginary accumulator 875b.

Figure 10C:
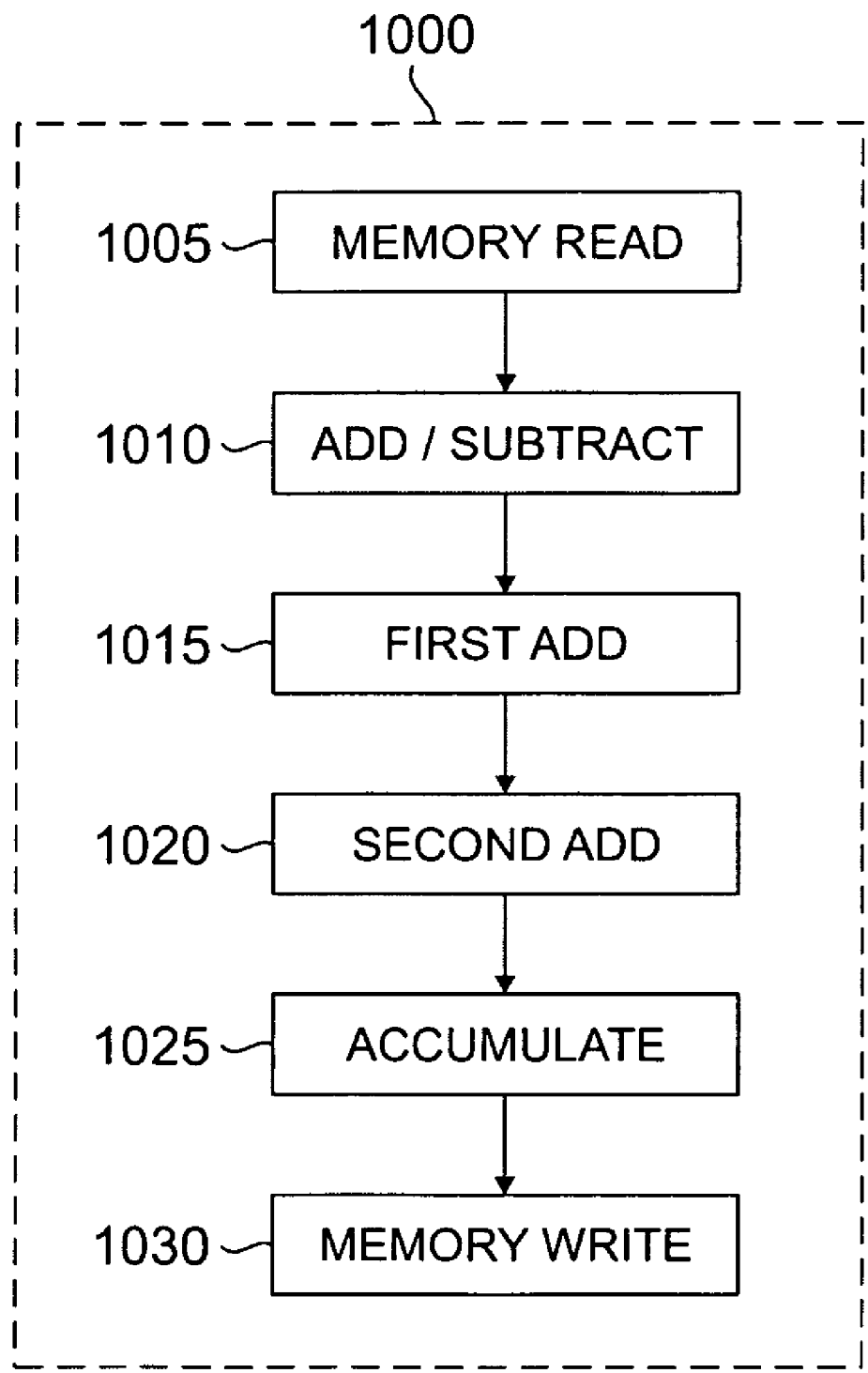
FIG. 10C is a flow diagram illustrating the operation of the correlation unit according to the principles of the present invention.

FIG. 10C depicts flow diagram 1000, which summarizes the operation of processing units 801 and 802 in correlation unit 800 according to the principles of the present invention. For the sake of simplicity, it shall be assumed that lower processing unit 801 is being discussed in FIG. 10C. Initially, four chip samples are read from memory 831 into processing unit 801 (process step 1005). Next, add-subtract cells 850a-850d produce sum (a+b) values and difference (a−b) values (produce 1010). The signs of the sum and difference values are modified according to the code bits from code generator 835. Next, the first stage addition occurs (process step 1015). The first stage addition reduces the four real inputs from sign select units 810a-810d down to two real sum values and reduces the four imaginary inputs from sign select units 810a-810d down to two imaginary sum values.

Next, the second stage addition occurs (process step 1020). The second stage addition reduces the two real sums from the first stage adders down to one real sum value and reduces the two imaginary sums from first stage adders down to one imaginary sum value. The real and imaginary sums produced by the second stage adders are then accumulated separately (process step 1025). Finally, when all of the chips in a symbol have been added in accumulators 825a and 825b, the values in accumulators 825a and 825b are written into memory 831 via bus 830.

It is noted that there will be a varying spreading factor according to the wireless standard used and the type of signal processed. For example, if lower processing unit 801 is processing a signal from a dedicated physical channel (DPCH) in a WCMDA embodiment, there may be as few as eight (8) chips to a symbol. In such a case, data is written out from accumulators 825a and 825b once every 8 chips. At the same time, upper processing unit 802 may be processing a common pilot channel (CPICH) signal using in a WCMDA embodiment. The CPICH signal uses Spreading Code 0, which has 256 chips to a symbol. In such a case, data is written out from accumulators 875a and 875b once every 256 chips. This scenario is depicted in FIG. 11.

Figure 11:
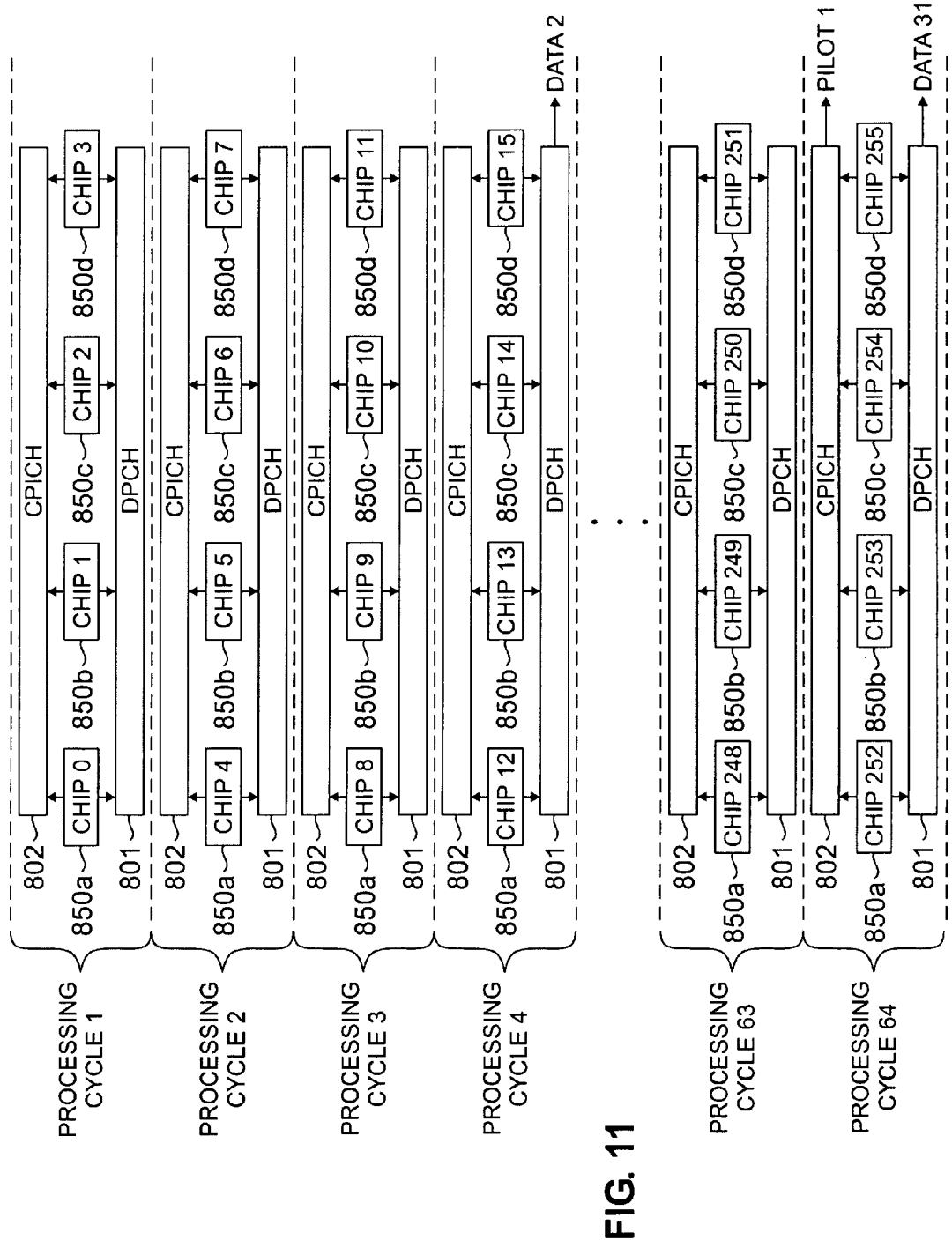
FIG. 11 illustrates the data output of the correlation unit in FIG. 8 during selected operation cycles according to one embodiment of the present invention.

FIG. 11 illustrates the data outputs of correlation unit 800 during the despreading of a WCDMA signal according to one embodiment of the present invention. In FIG. 11, lower processing unit 801 is processing a dedicated physical channel (DPCH) signal that uses 8-chip symbols and upper processing unit 802 is processing a common pilot channel (CPICH) signal using a 256-chip symbol. During Processing Cycle 1, lower processing unit 801 and upper processing unit 802 each process the first four chips, Chip 0 through Chip 3.

If one sample is taken per chip, Processing Cycle 1 requires only one memory read cycle from memory 831. If two samples are taken per chip (over-sampling rate=2), Processing Cycle 1 requires two memory read cycles from memory 831. If four samples are taken per chip (over-sampling rate=4), Processing Cycle 1 requires four memory read cycles from memory 831, and so forth. At the end of Processing Cycle 1, processing unit 801 has stored the results in accumulators 825a and 825b, but does not yet have an output, since a full 8-chip symbol has not yet been processed. Similarly, at the end of Processing Cycle 1, processing unit 802 has stored the results in accumulators 875a and 875b, but does not yet have an output, since a full 256-chip symbol has not yet been processed.

During Processing Cycle 2, lower processing unit 801 and upper processing unit 802 each process the next four chips, Chip 4 through Chip 7. At the end of Processing Cycle 2, processing unit 801 outputs the results in accumulators 825a and 825b as Data 1, since a full 8-chip symbol has been processed. At the end of Processing Cycle 2, processing unit 802 continues to store the results in accumulators 875a and 875b, but does not yet have an output, since a full 256-chip symbol has not yet been processed.

This process continues for a total of 64 Processing Cycles, with processing unit 801 putting out a result once every two cycles as groups of eight chips are processed. Processing unit 802 only puts out one result, Pilot 1, in Processing Cycle 64 after all 256 chips are processed.

Figure 12:
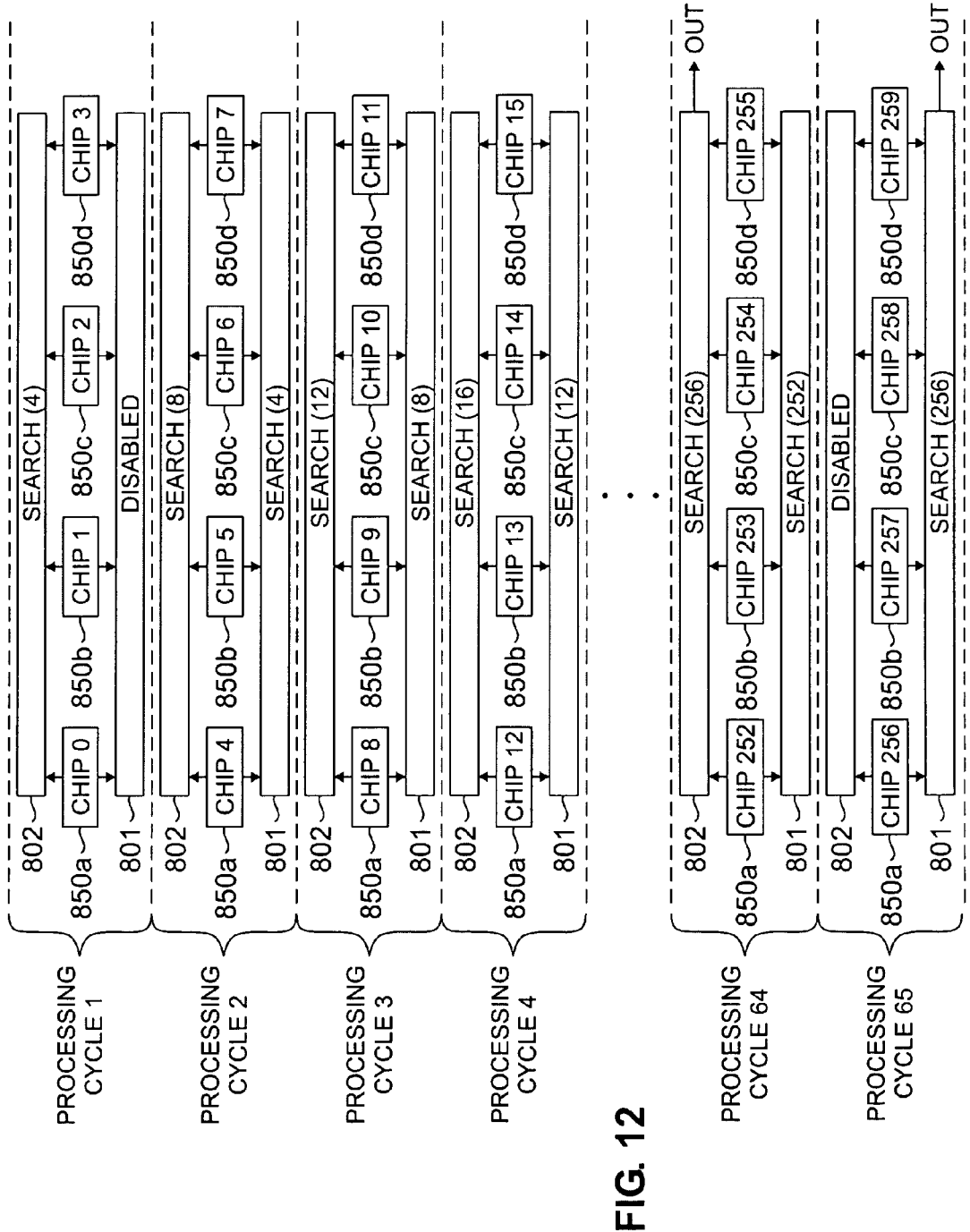
FIG. 12 illustrates the data output of the correlation unit in FIG. 8 during selected operation cycles according to one embodiment of the present invention.

FIG. 12 illustrates the data output of the correlation unit in FIG. 8 during a WCDMA cell search operation according to one embodiment of the present invention. Processing unit 801 trails processing unit 802 by 4 chips. At the end of Processing Cycle 1, processing unit 802 has processed the first four chips, Chip 0 through Chip 3, while processing unit 801 was disabled (idle). At the end of Processing Cycle 2, processing unit 802 has processed a total of 8 chips and processing unit 801 has processed a total of 4 chips. At the end of Processing Cycle 3, processing unit 802 has processed a total of 12 chips and processing unit 801 has processed a total of 8 chips. At the end of Processing Cycle 4, processing unit 802 has processed a total of 16 chips and processing unit 801 has processed a total of 12 chips.

At the end of Processing Cycle 64, processing unit 802 has processed a total of 256 chips and outputs a result, Out 1. At the same time, processing unit 801 has processed a total of 252 chips. At the end of Processing Cycle 65, processing unit 801 has processed a total of 256 chips and outputs a result, Out 2. During Processing Cycle 65, processing unit 802 is disabled (idle).

Advantageously, because memory 831, code generator 835, and processing units 801 and 802 are loosely coupled, these components may be configured for different systems and/or functions. Also, memory 831, code generator 835, and processing units 801 and 802 may be shut down separately when not in use in order to save power. Moreover, the correlation unit architecture described above is easily scalable and may be easily duplicated to achieve the required performance.

Although the present invention has been described with an exemplary embodiment, various changes and modifications may be suggested to one skilled in the art. It is intended that the present invention encompass such changes and modifications as fall within the scope of the appended claims.

What is claimed is:

1. A re-configurable correlation unit for correlating a sequence of chip samples, said re-configurable correlation unit comprising:
    a memory for storing said sequence of chip samples;
    a plurality of add-subtract cells, wherein each of said add-subtract cells is capable of receiving a plurality of real bits, a, from a first chip sample in said memory and a plurality of imaginary bits, b, from said first chip sample; and
    a processing unit comprising:

a plurality of sign select units, each of said plurality of sign select units capable of receiving from one of said plurality of add-subtract cells a first input equal to a sum (a+b) of said plurality of real bits, a, and said plurality of imaginary bits, b, and a second input equal to a difference (a−b) of said plurality of real bits, a, and said plurality of imaginary bits, b, and wherein said each sign select unit generates a real output and an imaginary output, wherein each of said real output and said imaginary output is equal to one of: 1) said sum (a+b) multiplied by one of +1 and −1 and 2) said difference (a−b) multiplied by one of +1 and −1.

2. The correlation unit as set forth in claim 1, further comprising a code generator for generating a sequence of code bits, wherein said each sign select unit receives a real code bit and an imaginary code bit from said sequence and wherein said real and imaginary code bits determine a value of said real output and a value of said imaginary output of said each sign select unit.

3. The correlation unit as set forth in claim 2, wherein said processing unit further comprises a first stage of adders comprising a first plurality of real adders and a first plurality of imaginary adders.

4. The correlation unit as set forth in claim 3, wherein each of said first plurality of real adders receives a first real output from one of said plurality of sign select units and a second real output from another one of said plurality of sign select units and produces a real sum output.

5. The correlation unit as set forth in claim 4, wherein each of said first plurality of imaginary adders receives a first imaginary output from one of said plurality of sign select units and a second imaginary output from another one of said plurality of sign select units and produces an imaginary sum output.

6. The correlation unit as set forth in claim 5, wherein said processing unit further comprises a second stage of adders comprising at least one real adder and at least one imaginary adder.

7. The correlation unit as set forth in claim 6, wherein each of said at least one real adder in said second stage receives a first real sum output from one of said first plurality of real adders and a second real sum output from another one of said first plurality of real adders and produces a real sum output.

8. The correlation unit as set forth in claim 7, wherein each of said at least one imaginary adder in said second stage receives a first imaginary sum output from one of said first plurality of imaginary adders and a second imaginary sum output from another one of said first plurality of imaginary adders and produces an imaginary sum output.

9. The correlation unit as set forth in claim 8, wherein said processing unit further comprises a first accumulator capable of receiving and accumulating real sum outputs from said at least one real adder in said second stage.

10. The correlation unit as set forth in claim 9, wherein said processing unit further comprises a second accumulator capable of receiving and accumulating real sum outputs from said at least one imaginary adder in said second stage.

11. A software-defined radio (SDR) system comprising a reconfigurable data processor, said reconfigurable data processor comprising a re-configurable correlation unit for correlating a sequence of chip samples, said re-configurable correlation unit comprising:
a memory for storing said sequence of chip samples;
a plurality of add-subtract cells, wherein each of said add-subtract cells is capable of receiving a plurality of real bits, a, from a first chip sample in said memory and a plurality of imaginary bits, b, from said first chip sample; and
a processing unit comprising:
a plurality of sign select units, each of said plurality of sign select units capable of receiving from one of said plurality of add-subtract cells a first input equal to a sum (a+b) of said plurality of real bits, a, and said plurality of imaginary bits, b, and a second input equal to a difference (a−b) of said plurality of real bits, a, and said plurality of imaginary bits, b, and wherein said each sign select unit generates a real output and an imaginary output, wherein each of said real output and said imaginary output is equal to one of: 1) said sum (a+b) multiplied by one of +1 and −1 and 2) said difference (a−b) multiplied by one of +1 and −1.

12. The software-defined radio (SDR) system as set forth in claim 11, further comprising a code generator for generating a sequence of code bits, wherein said each sign select unit receives a real code bit and an imaginary code bit from said sequence and wherein said real and imaginary code bits determine a value of said real output and a value of said imaginary output of said each sign select unit.

13. The software-defined radio (SDR) system as set forth in claim 12, wherein said processing unit further comprises a first stage of adders comprising a first plurality of real adders and a first plurality of imaginary adders.

14. The software-defined radio (SDR) system as set forth in claim 13, wherein each of said first plurality of real adders receives a first real output from one of said plurality of sign select units and a second real output from another one of said plurality of sign select units and produces a real sum output.

15. The software-defined radio (SDR) system as set forth in claim 14, wherein each of said first plurality of imaginary adders receives a first imaginary output from one of said plurality of sign select units and a second imaginary output from another one of said plurality of sign select units and produces an imaginary sum output.

16. The software-defined radio (SDR) system as set forth in claim 15, wherein said processing unit further comprises a second stage of adders comprising at least one real adder and at least one imaginary adder.

17. The software-defined radio (SDR) system as set forth in claim 16, wherein each of said at least one real adder in said second stage receives a first real sum output from one of said first plurality of real adders and a second real sum output from another one of said first plurality of real adders and produces a real sum output.

18. The software-defined radio (SDR) system as set forth in claim 17, wherein each of said at least one imaginary adder in said second stage receives a first imaginary sum output from one of said first plurality of imaginary adders and a second imaginary sum output from another one of said first plurality of imaginary adders and produces an imaginary sum output.

19. The software-defined radio (SDR) system as set forth in claim 18, wherein said processing unit further comprises a first accumulator capable of receiving and accumulating real sum outputs from said at least one real adder in said second stage.

20. The software-defined radio (SDR) system as set forth in claim 19, wherein said processing unit further comprises a second accumulator capable of receiving and accumulating real sum outputs from said at least one imaginary adder in said second stage.

* * * * *